United States Patent [19]

Stechly

[11] Patent Number: 5,622,348
[45] Date of Patent: Apr. 22, 1997

[54] PROJECTOR MOUNTING AND ALIGNMENT DEVICE

[75] Inventor: Paul M. Stechly, Mississauga, Canada

[73] Assignee: Applied Electronics Limited, Mississauga, Canada

[21] Appl. No.: 514,552

[22] Filed: Aug. 14, 1995

[51] Int. Cl.⁶ .................................................. A47G 29/00
[52] U.S. Cl. ........................................... 248/371; 248/429
[58] Field of Search ...................................... 248/371, 393, 248/396, 397, 429, 430, 454, 441.1, 447.4; 353/72, 73

[56] References Cited

U.S. PATENT DOCUMENTS

5,511,492  4/1996  Zaguroli, Jr. ............................ 248/393

Primary Examiner—Ramon O. Ramirez
Attorney, Agent, or Firm—Clifford W. Browning; Woodard, Emhardt, Naughton Moriarty & McNett

[57] ABSTRACT

A projector mounting and alignment device having a support frame, a base member longitudinally slidable relative to the support frame between a retracted and an axtended position. A connector is provided for connecting the base member to the support frame in the retracted position. A pivot plate is pivotally mounted to the base member. A projector mounting plate is hingedly connected to the pivot plate by a hinge member. The projector mounting plate is also pivotally connected to the hinge member. A pivot plate adjuster acts between the base member and the pivot plate to position the pivot plate relative to the base member. A projector mounting plate adjuster acts between the pivot plate and the projector mounting plate to position the projector mounting plate relative to the base plate.

9 Claims, 6 Drawing Sheets

PROJECTOR MOUNTING AND ALIGNMENT DEVICE

FIELD OF THE INVENTION

This invention relates to rear projection displays and more particularly to projector mounting and alignment devices for such displays having a plurality of adjacent monitors with a separate projector for each monitor.

BACKGROUND OF THE INVENTION

Large monitors such as those used for maps generally include a plurality of adjacent rear projection screens which may typically have diagonal dimensions on the order of 72,84 or 100 inches. The screens are lenticular Fresnel lens screens and each screen typically has its own datagraphic projector.

If space is available, the projector may be mounted to project directly at the screen. If space is restricted the projector may be mounted above or below the screen and be directed at a mirror which in turn reflects the image on to the screen.

A typical projector, such as the Marquee™ 8000 projector manufactured by Electrohome Limited weighs on the order of 120 pounds. As each projector projects a portion of the overall image the projectors have to be supported and properly positioned behind the screen to ensure proper edge alignment of the adjacent images. The projectors should also be readily accessible for servicing and replacement.

Positioning of each projector requires that the projector be tiltable about various axes so that the image is movable horizontally, vertically and rotatably relative to the screen. Failure to properly position the projector will result in edge misalignment between adjacent images which, for example in the case of maps, will result in discontinuities of streets from one screen to another.

When the projectors are in use, heat is generated resulting in misalignment caused by thermal factors such as expansion. The projector mounting mechanism should be adjustable to compensate for such misalignment.

Previous inverted projector mounts for use in mirrored applications are inadequate for several reasons. Firstly, most prior projector mounts rely on relatively crude friction adjustment mechanisms which include slotted holes and locking nuts that can be slackened to enable movement between components and tightened to lock the components in place. Such adjusters do not enable very fine adjustment for precise alignment of adjacent images requiring that final adjustments be made by adjusting the electronic picture geometry circuits within the projector. Unfortunately an inherent trait of such projectors is that the decree of instability of the projected image increases so as to be proportionately more unstable as the degree of corrective adjustment is increased.

Also, most prior projector mounts require that a set-up technician move the projector's weight by hand against loosened friction adjusters. This not only limits the accuracy of the adjustment but also creates a safety hazard as the projectors may be 20 feet above the floor and only accessible by scaffolding or a ladder through an access opening.

The projector mounting and alignment device of the present invention, which is described in more detail below, enables a projector to be accurately positioned, adjusted within fine tolerances (on the order of ±0.5 pixel), further adjusted to compensate for image shifts which arise during projector use and also enhances access to the projector for projector replacement and servicing purposes.

A further feature of the present invention is that it provides for very fine adjustments to be made with minimal effort to enable a set-up technician to relatively safely align projected images without relying on the electronic picture adjustment circuits thereby maximizing image stability.

Yet another feature of the projector mounting and alignment device of the present invention is that the device enables the projector to be slid out of position for ease of access for servicing yet guides the projector back into its adjusted position without introducing any substantial amount of misalignment.

SUMMARY OF THE INVENTION

A projector mounting and alignment device having a support frame and a base member slidably connected to the support frame. The base member is longitudinally movable relative to support frame in a first plane between a retracted position and an extended position.

A pivot plate is pivotally connected to the base member and pivotally movable relative to the base member about a first pivot axis generally perpendicular to the first plane.

A hinge member is hingedly connected to the pivot plate and tiltable with respect to the pivot plate about a hinge axis generally parallel to the first plane and generally orthogonal to the pivot axis.

A projector mounting plate is pivotally connected toward a first end thereof to the hinge member, pivotal with respect to the hinge member about a second pivot axis generally orthogonal to the hinge axis and tiltable with the hinge member about the hinge axis.

A connector is provided for connecting the base member to the support frame when the base member is in the retracted position.

A pivot plate adjuster acts between the base member and the pivot plate to position the pivot plate relative to the base member about the first pivot axis.

A projector mounting plate adjuster is provided and acts between the pivot plate and the projector mounting plate to position the projector mounting plate relative to the pivot plate about the hinge axis and to position the projector mounting plate relative to the hinge member about the second pivot axis.

BRIEF DESCRIPTION OF THE DRAWINGS

Preferred embodiments of the invention are described in more detail below with reference to the accompanying drawings in which:

3

FIG. 7, which is on the last sheet of drawings after FIG. 9, is a sectional view on line 7—7 of FIG. 6;

DESCRIPTION OF PREFERRED EMBODIMENTS

Figure 1:
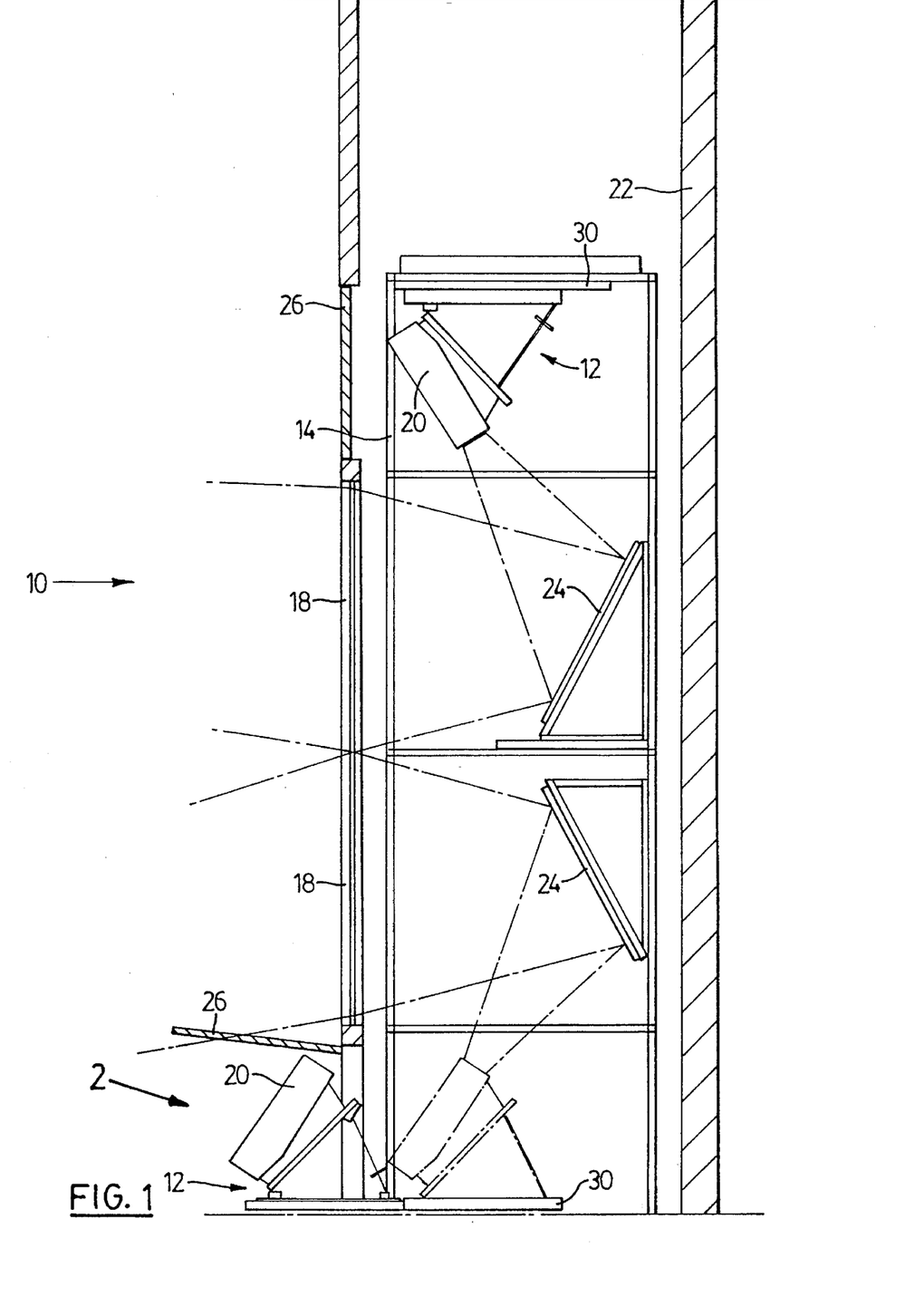
FIG. 1 is an end elevation showing a monitor having two projector mounting devices according to the present invention.

FIG. 1 is a view from one end of a monitor generally indicated by reference 10 and illustrates how a projector mounting and alignment device generally indicated by reference 12 may be incorporated into a monitor 10. The monitor 10 includes a scaffold-like structure 14 to which a supporting frame 30 of the projector mounting and alignment devices 12 may be secured.

A screen section is indicated by reference 18 and as shown the screen may comprise several adjacent screen sections 18.

Mounted to each of the projector mounting and alignment devices 12, is a projector 20. The projectors 20 each typically project images in three colors namely red, green and blue which are superimposed on the screen sections 18 to create a color projection.

If space permitted, the projectors 20 could be mounted so as to project directly onto the screen sections 18. This however requires a considerable distance between the screen sections 18 and the individual projectors 20.

In the configuration illustrated in FIG. 1, the presence of a wall 22 limits the space behind the screen sections 18, thereby preventing mounting of the projectors 20 directly behind the screen sections 18. Furthermore, the wall 22 lacks any access openings for servicing the projectors 20. Accordingly, the projectors 20 are mounted above or below the screen sections 18 and rather than being pointed directly at the screen sections 18, are pointed at mirrors 24 which reflect the image projected by the projectors 20 onto the screen sections 18.

Access openings 26 are provided above and below the screen sections 18 to enable replacement or servicing of the projectors 20.

As described in more detail below, the projector mounting and alignment devices 12 are slidable from a retracted position such as shown at the top of FIG. 1 to an extended position through the access openings 26 as illustrated at the bottom of FIG. 1. This further enhances access to the projectors 20 for replacement or servicing purposes.

As the total image presented on the monitor 10 is made up of image sections projected on each screen section 18, in order to get a good quality total image it is necessary to be able to accurately position and align the projectors 20 to ensure that the edges of the images on the individual screen sections 18 line up.

Figures 2, 11:
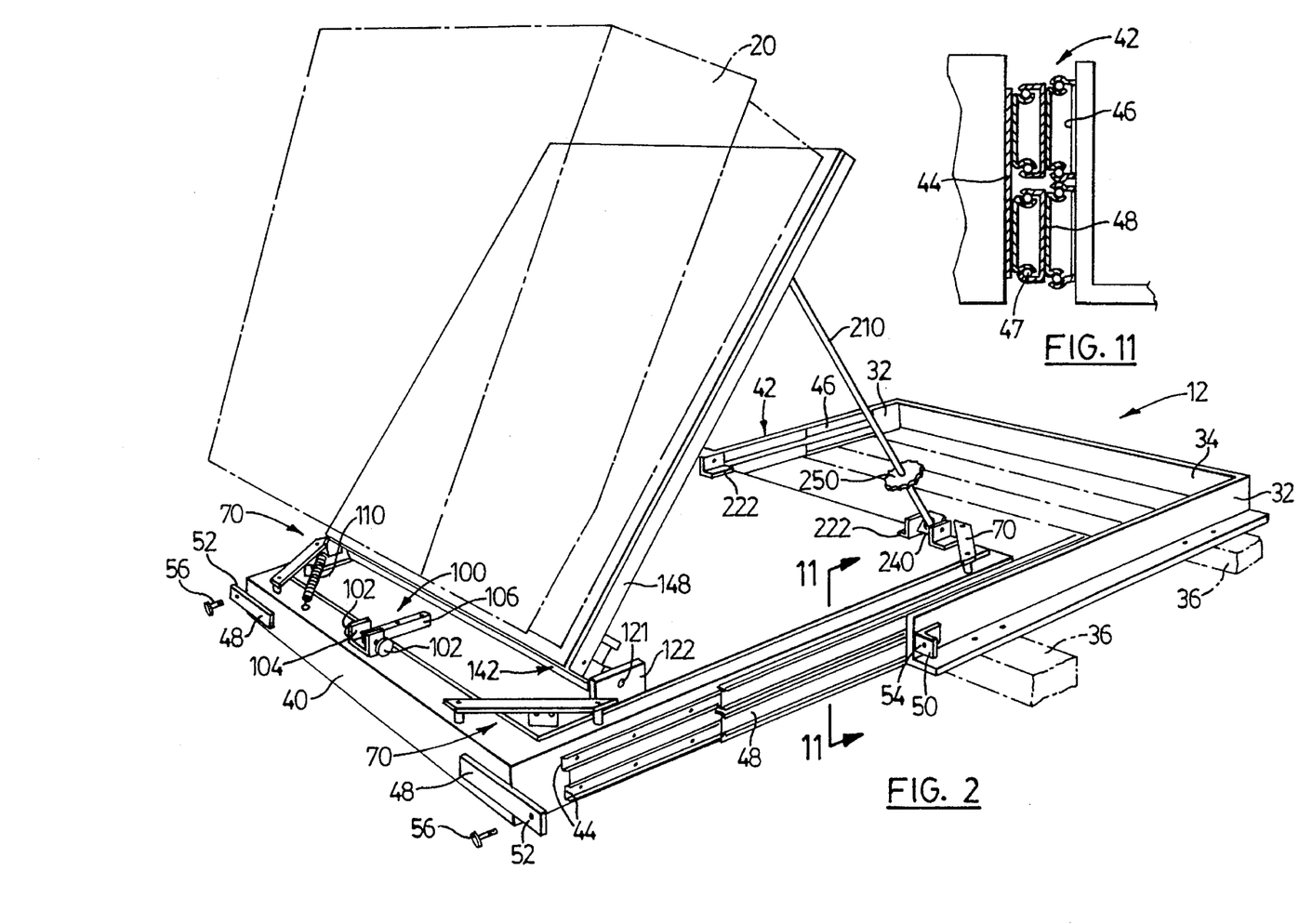
FIG. 2 is a perspective view in the direction of arrow 2 in FIG. 1 of a projector mounting and alignment device according to the present invention.
FIG. 11 is a sectional view on line 11—11 of FIG. 2.

The projector alignment and mounting device 12 is illustrated in more detail in FIG. 2. The projector mounting and alignment device has a support frame 30 consisting of two generally parallel side members 32 and a rear member 34 extending between side members 32 to define a generally U-shaped structure. The support frame 30 is used to mount and support the projector mounting and alignment device 12. FIG. 2 illustrates the support frame 30 attached to a pair of transverse generally parallel box shaped members illustrated in dashed outline at reference 36. The box shaped members 36 may form part of the support structure 14 in FIG. 1.

A generally rectangular base member 40 is slidably connected to the side members 32 of the support frame 30 by slide members 42. The slide members 42, which are shown in more detail in FIG. 2B, include slide rails 44 connected to opposite sides of the base member 40, and corresponding slide rails 46 connected to the support frame 30. An intermediate member 48 connects the slide rails 44 to the slide rails 46. Rollers 47 are interspersed between the intermediate member 48 and the slide rails 44 and 46. The slide member 42 may be standard heavy duty slide rails such as sold under the trade-mark CHASSIS TRAK.

The slide members 42 enable the base member 40 and all of the structures supported thereon to be slid into the support frame 30 in a retracted position and slid out of the support frame 30 in an extended position, the latter being illustrated in FIG. 2.

The end of the base member 40 toward the left of FIG. 2 is provided with generally rectangular first connector member or tabs 48 extending laterally outwardly from the base member 40. Corresponding generally L-shaped second connector member tabs 50 are provided on the side members 32 toward the end opposite the rear member 34. The securing tabs 48 are provided with holes 52 which register with threaded holes 54 in the securing caps 50 on the support frame 30. Thumb screws 56 may be inserted through the holes 52 in the tabs 48 and threaded into the threaded holes 54 in the securing tabs 50 on the support frame to act as a connector to connect the base member 40 to the support frame 30 in the retracted position.

Figures 9, 9A:
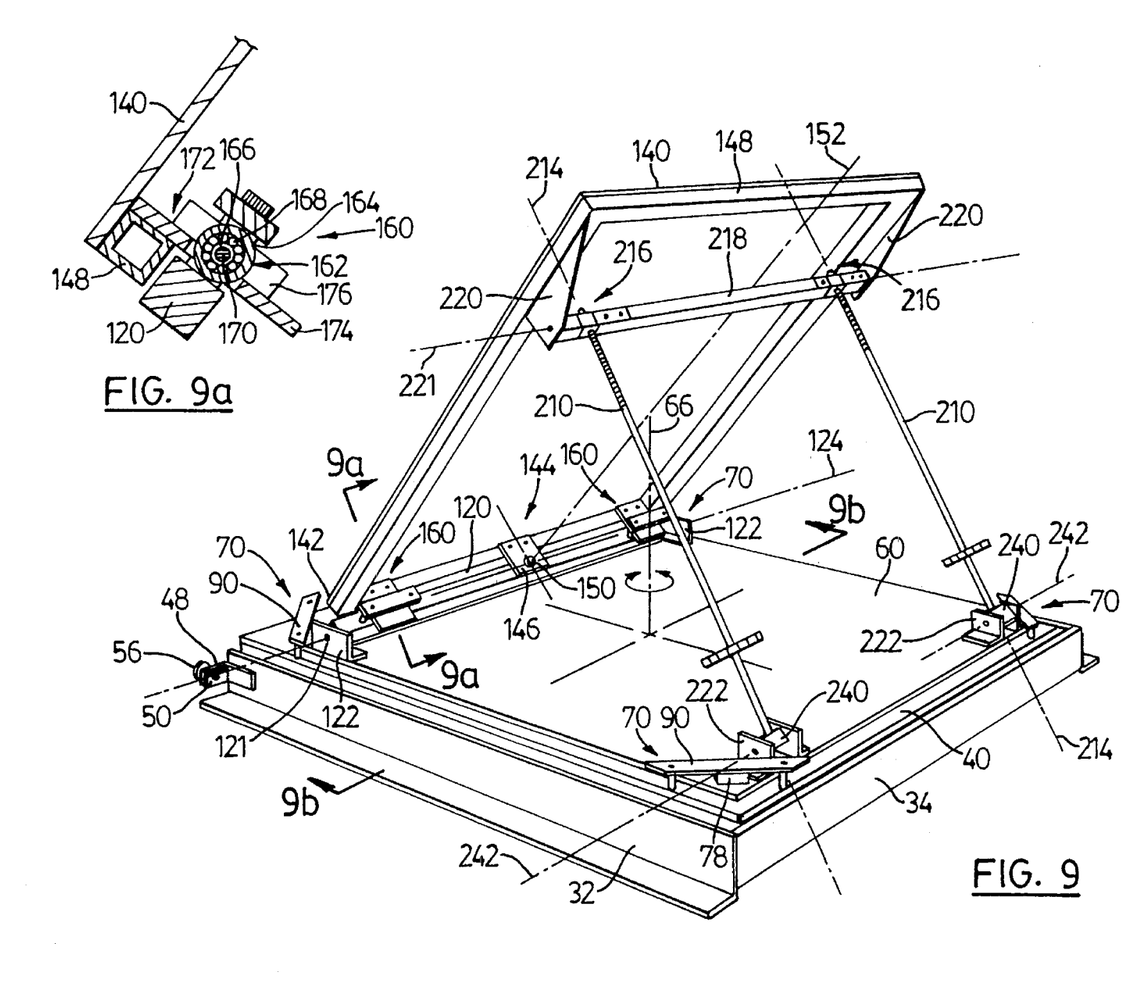
FIG. 9 is a rear perspective view of a projector mounting and alignment device according to the present invention.
FIG. 9a is a sectional view on line 9a—9a of FIG. 9.
Figure 9B:
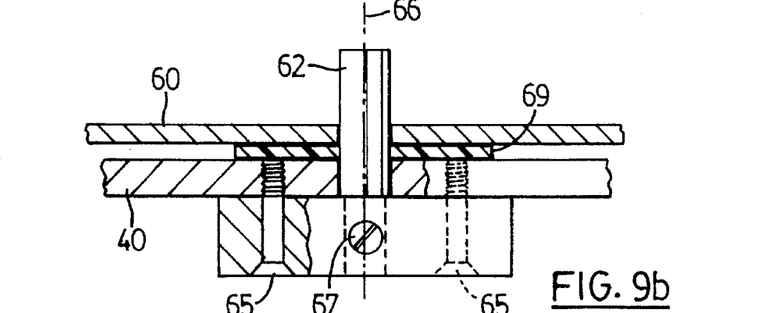
FIG. 9B is a sectional view on line 9B—9B of FIG. 9.

As shown in FIGS. 2 and 9, a generally rectangular pivot plate 60 is mounted generally parallel and adjacent to the base member 40. As shown in FIG. 9b, the pivot plate 60 is pivotally connected to the base member 40 by a pivot post 62 extending upwardly from the base member 40 and received in an opening 64 in the pivot plate 60. The pivot post 62 is mounted in a securing block 63 attached to the underside of the base member 40 by screws 65. Set screw 67 secures the pivot post 62 to the securing block 63. A self-lubricating plastic bushing 69 having a thickness generally corresponding to the breadth of the gap between the pivot plate 60 and base member 40 interspersed therebetween over the pivot post 62. The pivot plate 60 is thereby pivotally movable relative to the base member 40 about a first pivot axis 66 generally perpendicular to the pivot plate 60 and also generally perpendicular to the plane in which the base member 40 is slidable relative to the support frame 30.

The pivot plate 60 is supported adjacent the base member 40 at each of the four corners by guide wheel assemblies which are generally indicated by reference 70. The guide wheel assemblies 70 are shown in more detail in FIGS. 6, 7 and 8. The guide wheels assemblies 70 include guide wheels 72 mounted on shafts 74 and rotatable about an axis of rotation which generally intercepts the first pivot axis so that the guide wheels 72 are aligned generally tangentially to the pivotal movement of the pivot plate 60 above the first pivot axis 76.

Figure 6:
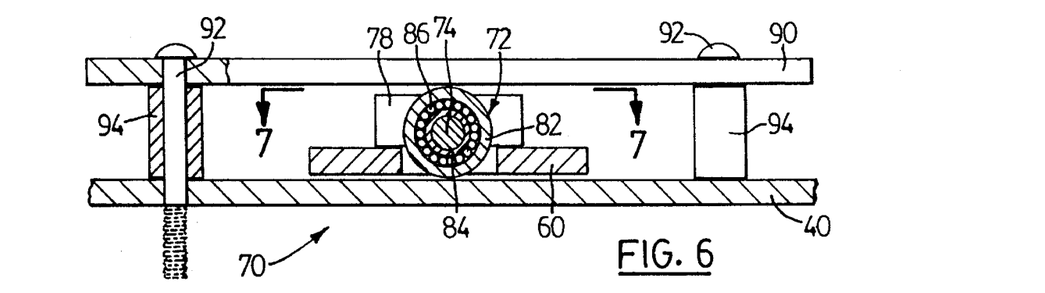
FIG. 6 is a sectional view on line 6—6 of FIG. 5.
Figure 7:
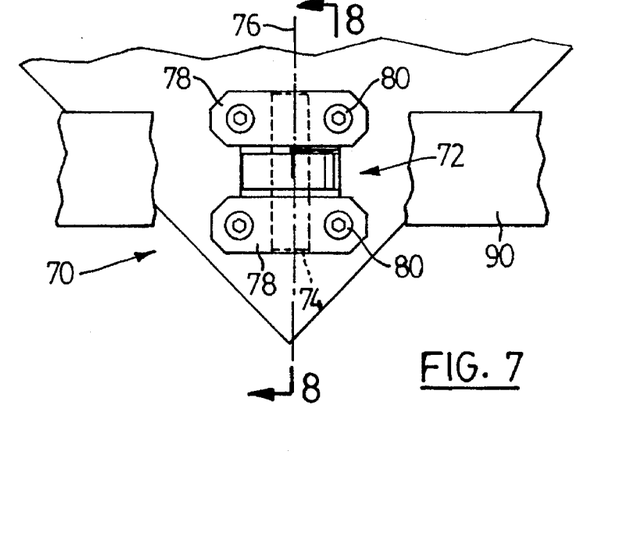
Figure 8:
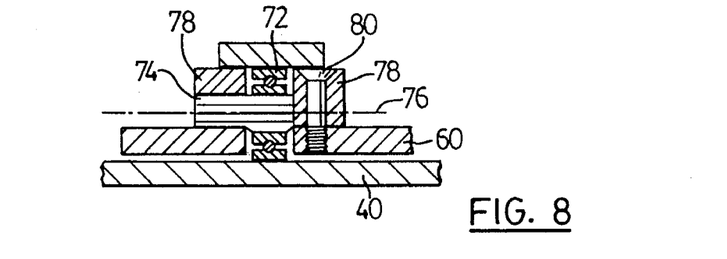
FIG. 8 is a sectional view on line 8—8 of FIG. 7.

The shafts 74 are attached by means of brackets 78 and screws 80 to the pivot plate 60. The guide wheels 72 project above the brackets 78 and below the pivot plate 60.

Each of the guide wheels 72 includes a generally cylindrical outer member 82 which is generally coaxial with and rotatable about an inner member 84. Bearing members in the form of balls or rollers 86 are interspersed between the inner and outer members 82 and 84 respectively to align the inner and outer members and reduce rolling friction therebetween. In a preferred embodiment of the invention the guide wheels 70 may be conventional ball or roller bearings. Alternatively, each guide wheel 70 could be a solid member merely having a cylindrical hole through its center for receiving the shaft 74. In another alternative embodiment the inner member may be a bushing which acts as a bearing member between the shaft 74 and the outer member 82.

As illustrated in FIG. 1, the projector mounting and alignment device 12 of the present invention may be used in an upright position with the projector 20 mounted upon it or in an inverted position with the projector 20 suspended from it.

When the projector mounting and alignment device 12 is in the upright position the guide wheels 72 rollably engage the base member 40 to support the pivot plate 60 above the base member 40.

When the projector mounting and alignment device 12 is in the inverted position it is of course necessary to prevent the pivot plate 60 from separating from the base member 40. This may be accomplished by the use of a support rail 90 in FIG. 6 which extends across each of the guide wheels 72 and is rigidly secured to the base member 40 by threaded fasteners 92. Cylindrical spacers 94 extend around the threaded fasteners 92 between the rail 90 and the base member 40 to keep the rail 90 spaced apart from the base member 40 by a predetermined amount corresponding to length of the spacers 94.

When the projector mounting and alignment device 12 is inverted the guide wheel 72 rollably engages the adjacent face of the support rail 90 thereby maintaining the pivot plate 60 generally adjacent the base member 40.

Figure 5:
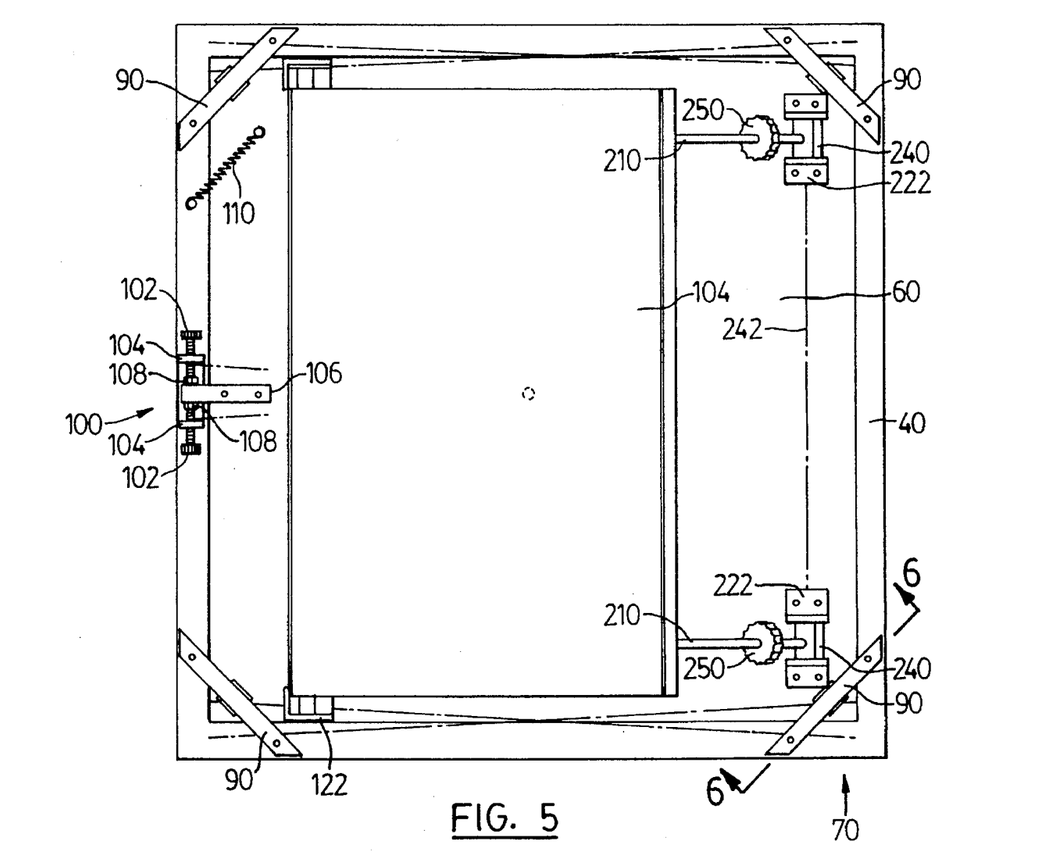
FIG. 5 is a top plan view of a projector mounting and alignment device according to the present invention.

A pivot plate adjuster, generally indicated by reference 100 in FIGS. 2 and 5 acts between the base member 40 and the pivot plate 60 to position the pivot plate 60 relative to the base member 40 about the first pivot axis 66. The pivot plate adjuster 100 includes a pair of opposite facing screw members shown as thumbscrews 102 which are threaded through respective generally rectangular screw member supports 104 extending upwardly from and rigidly secured to the base member 40. A generally rectangular screw abutment 106 is secured to the base member 40 and extends between the screw member supports 104.

The screw members 102 may be threaded into and out of the screw member supports 104 to press against the screw abutment 106 to cause relative movement between the screw member support and the screw abutment to cause in turn movement of the pivot plate 60 relative to the base member 40 about the first pivot axis 66. The screw members 102 may be secured against rotation using a locking nuts such as illustrate at reference 108 to maintain the set relative position between the base member 40 and the pivot plate 60.

A resilient biasing member in the form of the spring 110 is illustrated toward the upper left corner of FIG. 5. The spring 110 is secured at its one end to the base member 40 and at the other end to the pivot plate 60. The spring 110 acts in tension to bias the screw abutment 106 toward the lowermost of the two screw members supports 104. The presence of the spring 110 helps to eliminate any free play between pivot plate 60 and the base member 40 and also facilitates adjustment of the pivot plate adjuster 100. Were it not for the spring 110 it would be necessary to simultaneously move both of the screw members 102 to pivot the pivot plate 60 about the first pivot axis 66. The presence of the screw member 110 makes it possible to slacken the uppermost of the two screw members 102 and adjust the pivot plate 60 using only the lowermost of the two screw members 102 because the spring 110 prevents the screw abutment 106 from swinging away from the lowermost screw member 102. The uppermost screw member 102 may then be used to lock the adjustment in place and prevent movement of the pivot plate 60 against the tension of the spring 110.

Although a particular plate adjuster 100 has been described in detail it will be appreciated by those skilled in the art that different adjusters may be substituted. For example, the adjuster may be reversed to mount the screw abutment 106 to the base member 40 rather than the pivot plate 60 and to correspondly mount the screw member supports 104 to the pivot plate 60 rather than the base member 40.

As shown in FIG. 9, a generally rectangular hinge member 120 extends across the pivot plate 60 adjacent the end opposite the rear member 34 of the support frame 30. The hinge member 120 is essentially a square or rectangular cross section tube pivotally mounted at opposite ends such as by pins 121 to generally L-shaped hinged member brackets 122. The hinge member pivots about a hinge axis 124 is generally parallel to the upper surface of the pivot plate 60 and generally orthogonal to the first pivot axis 66. As the hinge member is connected to the pivot plate 60 the hinge will move with the pivot plate 60 about the first pivot axis 66.

A generally rectangular projector mounting plate 140 is pivotally connected toward a first end 142 thereof to the hinge member 120. The pivotal connection is shown at reference 144 in FIGS. 4 and 9 and includes an attachment member 146 rigidly attached to and extending from a generally rectangular tubular support frame 148 extending around the perimeter of the projector mounting plate 140. A pivot pin 150 extends through an opening in the attachment member 140 and is rigidly connected to the hinge member 120. The pivotal connection allows the projector mounting plate 140 to be pivoted with respect to the hinge member 120 about a second pivot axis 152, generally orthogonal to the hinge axis 124. The projector mounting plate 140 is further tiltable along with the hinge member 120 about the hinge axis 124.

Figures 3, 3A:
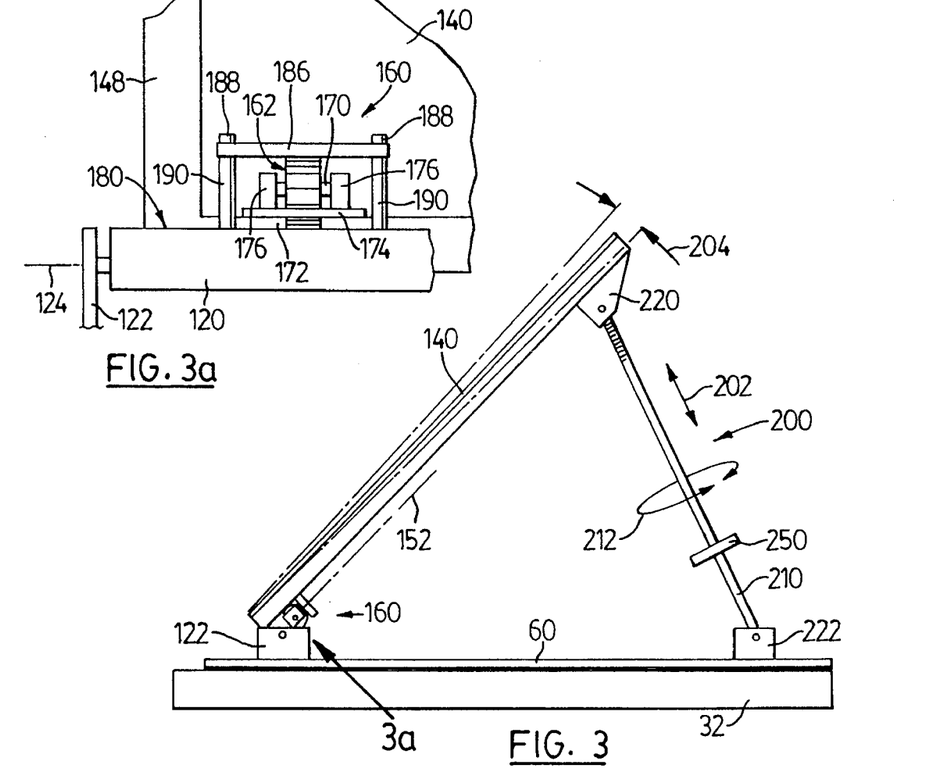
FIG. 3 is an end elevation of a projector mounting and alignment device according to the present invention.
FIG. 3a is a perspective view in the direction of arrow 3a in FIG. 3 showing part of the projector mounting plate attachment.

The projector mounting plate 140 is slidably supported adjacent the hinge member 120 adjacent the ends of the hinge member 20 by guide wheels 162 mounted within guide wheel assemblies generally indicated by reference 160 and shown in detail in FIGS. 3a and 9a. The guide wheels assemblies 160 are similar to the guide wheel assemblies 70 which support the pivot plate 60 above the base member 40. Each of the guide wheel assemblies 160 includes a guide wheel 162 which preferably but not essentially has a generally cylindrical outer member 164 coaxial with and rotatable about an inner member 166 and separated therefrom by bearing members such as balls or rollers 168 which reduce rolling friction between the inner and outer members 164 and 166 respectively. The inner member 166 is mounted on a shaft 170 connected to the projector mounting plate support frame 148 by a shaft mounting bracket generally indicated by reference 172. The shaft mounting bracket includes a plate-like member 174 rigidly connected to the projector mounting plate support frame 148 and a pair of upright members 176 which extend from the member 174 on either side of the guide wheel 162. The shaft 170 supporting the support wheel 162 is mounted between and supported by the upright members 176. The members 176 may be generally the same as members 78 in FIGS. 6, 7 and 8.

The guide wheel 160 rollably engages an upper face 180 of the hinge member 120 when the projector mounting and supporting device 12 is in an upright position. In order to prevent the projector mounting plate 140 from pulling away from the hinge member 120, a support rail 186 is provided and extends across the guide wheel 162 above the guide wheel and generally parallel to the upper surface 180 of the hinge member 120. The support rail 186 is rigidly secured to the hinge member 120 by any suitable means such as threaded fasteners 188 which extend through the support rail 186 and through tubular spacer members 190 and are secured to the hinge member 120. The tubular spacer members 190 in conjunction with the threaded fasteners 188 locate the support rail 186 at a predetermined distance from the hinge member 120.

Figure 4:
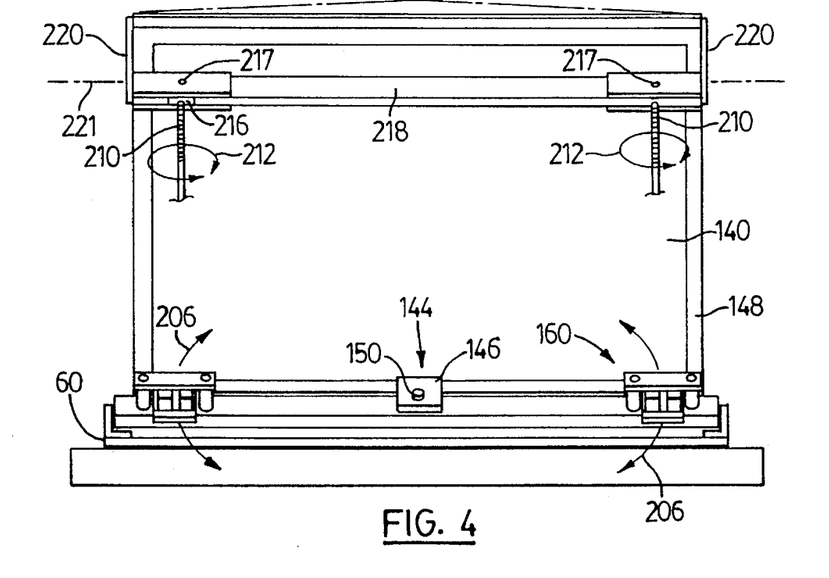
FIG. 4 is an end elevation of a projector mounting and alignment device according to the present invention.

As shown by arrows 202 and 204 in FIG. 3, a projector mounting plate adjuster generally indicated by reference 200 acts between the pivot plate 60 and the projector mounting plate 140 to position the projector mounting plate 140 relative to the pivot plate about the hinge axis 124. As indicated in FIG. 4 by arrows 206, the projector mounting plate adjuster 200, which is described in more detail below, also positions the projector mounting plate 140 relative to the hinge member 120 about the second pivot axis 152. The projector mounting plate adjuster 200 includes a pair of threaded adjustment rods 210 extending generally between the pivot plate 60 and projector mounting plate 140 adjacent the sides of the pivot and projector mounting plates 60 and 140 respectively and toward the respective ends thereof distal the hinge member 120. The adjustment rods 210 are rotatable in the direction of arrows 212 in FIG. 4 about respective rod axes 214 generally coaxial therewith. A pair of rod engaging members 216 threadedly engage the upper ends of the rods 210. The rod engaging members 216 are mounted by respective pins 217 to a bar 218 extending across the underside of the projector mounting plate toward the upper end as viewed in FIG. 9. The bar 218 is pivotally mounted to brackets 220 extending from the support frame 148 of the projector mounting plate 140. The bar 218 and accordingly the rod engaging members 216 and is pivotable about an axis 221 generally coaxial therewith. The rod engaging members are also pivotable about the axes of the pins 217.

The lower ends of the adjustment rods 210 are received in rod engaging members 240 mounted above the pivot plate 60 between opposed generally L-shaped brackets 222 secured to the pivot plate 60. The rod engaging members 240 are pivotable about an axis 242 generally parallel to the hinge axis 124. The rod engaging members 240 allow the adjustment rod 210 to rotate about the respective rod axis 214 while generally restraining longitudinal movement of the adjustment rods 210 along the respective rod axis 214.

Figure 10:
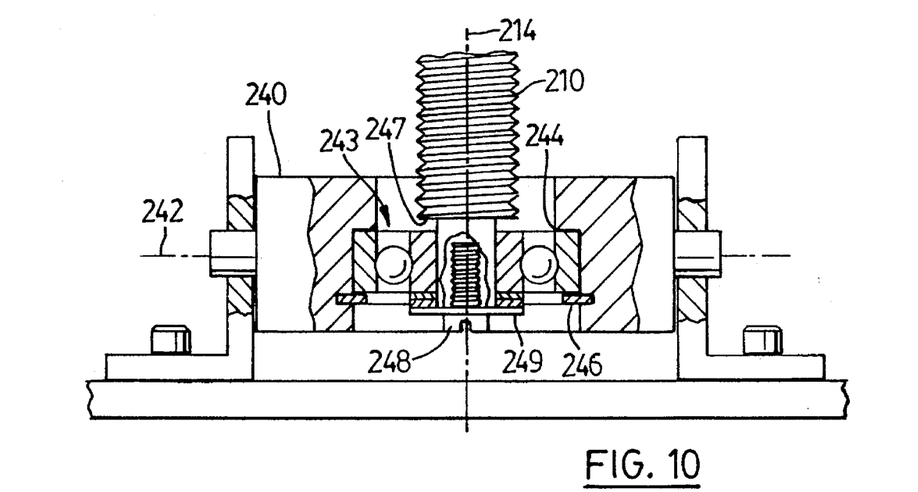
FIG. 10 is a sectional view on line 10—10 of FIG. 5.

As shown in FIG. 10 the lower end of the rod 210 may be supported in a bearing 243 mounted in the rod engaging member 240 and retained in place by a flange 244 and a retaining clip or snap-ring 246. A shoulder 247 on each adjustment rod 210, a screw 248 extending into the end of each adjustment rod 210 and a washer 249 secure each adjustment rods 210 to the bearing 243 to prevent relative longitudinal movement between the rod and the bearing while allowing the adjustment rods 210 rotate about their respective rod axes 214.

Each of the adjustment rods 210 is provided with a disc shaped knob 250 mounted along the length thereof to assist in rotating the adjustment rods 210. Rotating both of the adjustment rods 210 in the same direction will cause the projector mounting plate 140 to pivot about the hinge axis 124 either toward or away from the pivot plate 60 depending on the direction of rotation.

Rotating the adjustment rods 210 in opposite directions relative to each other will cause the projector mounting plate 140 to pivot relative to the hinge member 120 about the second pivot axis 152. The pivotal mounting of the rod engaging members 216 and 240 enables the desired relative movements between the adjustment rods 210, the projector mounting plate 140 and the pivot plate 160 without imparting undesirable bending moments on the adjustment rods 210.

It will be appreciated by persons skilled in such structures that variations to the projector mounting plate adjuster configuration described above may be possible. For example the adjustment rods 210 may consist of upper and lower oppositely threaded sections and connected by a central section threaded at both ends in a turnbuckle type of arrangement. Alternatively the adjustment rods may be made up of two telescopic threadedly connected sections each section having an outer end mounted in one of the rod engaging members 216 or 214 so as to be free to rotate but restrained from longitudinal movement relative to the rod engaging members.

The above description is intended to be interpreted in an illustrative rather than a restrictive sense. Variations to the structure described above may be apparent to an appropriately skilled person while staying within the spirit and scope of the invention as defined by the claims set out below.

I claim:

1. A projector mounting and alignment device comprising:
   a support frame;
   a base member slidably connected to said support frame and longitudinally movable with respect thereto in a first plane between a retracted position and an extended position;
   a pivot plate pivotally connected to said base member and pivotally movable relative to said base member about a first pivot axis generally perpendicular to said first plane;
   a hinge member hingedly connected to said pivot plate and tiltable with respect to said pivot plate about a hinge axis generally parallel to said first plane and generally orthogonal to said first pivot axis;
   a projector mounting plate pivotally connected toward a first end thereof to said hinge member and pivotal with respect to said hinge member about a second pivot axis generally orthogonal to said hinge axis and tiltable with said hinge member about said hinge axis;
   a connector for connecting said base member to said support frame when said base member is in said retracted position;
   a pivot plate adjuster acting between said base member and said pivot plate to position said pivot plate relative to said base member about said first pivot axis; and,
   a projector mounting plate adjuster acting between said pivot plate and said projector mounting plate to position said projector mounting plate relative to said pivot plate about said hinge axis and to position said projector mounting plate relative to said hinge member about said second pivot axis.

2. A projector mounting and supporting device as claimed in claim 1 wherein:

said base member and said supporting frame are slidably connected by slide members having respective slide rails mounted to said support frame and said base member, said slide rails having an intermediate member interspersed therebetween and having rollers between said intermediate members and said respective side members to allow relative telescopic movement between said slide rails thereby enabling and guiding said relative longitudinal movement between said base member and said support frame.

3. A projector mounting and supporting device as claimed in claim 1 wherein:

said pivot plate is at least partially supported above said base member by guide wheels, each said guide wheel having a generally cylindrical outer member coaxial with and rotatable about an inner member with at least one bearing member interspersed therebetween to align said inner and outer members and to reduce friction between said inner member and said outer member, said inner member being mounted on a shaft attached to said pivot plate and said outer member rollably engages said base member when said projector mounting and supporting device is in an upright position;

a support rail extends across each said guide wheel and is rigidly secured to said base member with said guide wheel interspersed therebetween to restrict movement of each said guide wheel away form said base member and said guide wheel rollably engages said support rail when said projector mounting and supporting device is in an inverted position to maintain said pivot plate generally adjacent said base member;

each said wheel has an axis of rotation which generally intersects said first pivot axis and said outer member is rollable in a direction generally tangential to the pivotal movement of said pivot plate about said first pivot axis.

4. A projector mounting and alignment device as claimed in claim 3 wherein said pivot plate is generally rectangular and one of said guide wheels is mounted adjacent each corner of said pivot plate.

5. A projector mounting and supporting device as claimed in claim 1 wherein:

said projector mounting plate is slidably supported adjacent said hinge member by guide wheels adjacent the ends of said hinge member;

each said guide wheel has a generally cylindrical outer member coaxial with and rotatable about an inner member and at least one bearing member is interspersed therebetween to align said inner and outer members and to reduce friction therebetween;

each said inner member is mounted on a shaft connected to a projector mounting plate support frame extending around said projector mounting plate adjacent the perimeter thereof, said shaft being generally radially aligned with said second pivot axis;

each said guide wheel rollably engages said hinge member when said projector mounting and supporting device is in an upright position;

a support rail extends across each said guide wheel and is rigidly secured to said hinge member to restrict movement of each said guide wheel away from said base member; and, said guide wheel rollably engages said support rail when said projector mounting and supporting device is in an inverted position.

6. A projector mounting and supporting device as claimed in claims 1, 2, 3, 4 or 5 wherein each said adjustable connector includes:

a first connector member rigidly secured to said supporting frame;

a second connector member rigidly secured to said base member; and a threaded member for connecting said first and second connector members when said projector mounting and supporting device is in said retracted position.

7. A projector mounting and supporting device as claimed in claims 1, 2, 3, 4 or 5 wherein said pivot plate adjuster includes:

at least one screw member;

a screw member support threadedly receiving each said screw member and rigidly secured to one of said base member and said pivot plate;

a screw abutment secured to the other of said base member and said pivot plate;

and wherein each said screw member extends between said screw member support and said screw abutment to cause relative movement between said screw member and said screw abutment when said screw member is threadedly moved relative to said screw member support.

8. A projector mounting and supporting device as claimed in claim 7 further including a resilient biasing member mounted between said base member and said pivot plate to bias at least one of said at least one screw members toward said screw abutment.

9. A projector mounting and supporting device as claimed in claim 1, 2, 3, 4 or 5 wherein:

said projector mounting plate adjuster includes a pair of adjustment rods rotatable about respective rod axes;

respective rod engaging members are connected to said projector mounting plate and said pivot plate for connecting opposite ends of each said rod to said projector mounting plate and to said pivot plate;

at least one end of said adjustment rods is threadedly connected to said respective rod engaging member to cause said rod engaging member to move along said adjustment rod in response to rotation of said adjustment rod;

each said respective rod engaging member is pivotally mounted to permit tilting of said rods relative to said projector mounting plate and said pivot plate in response to said pivoting of said projector mounting plate to avoid imparting a bending moment on said rod engaging members.

* * * * *